US008743171B2

(12) United States Patent
Hiller et al.

(10) Patent No.: US 8,743,171 B2
(45) Date of Patent: Jun. 3, 2014

(54) AUTOMATED CALENDARED CONFERENCE RESCHEDULING AND FORWARDING

(75) Inventors: Everett Hiller, Austin, TX (US); Erin Ammon, Austin, TX (US)

(73) Assignee: Polycom, Inc., San Jose, CA (US)

( * ) Notice: Subject to any disclaimer, the term of this patent is extended or adjusted under 35 U.S.C. 154(b) by 471 days.

(21) Appl. No.: 13/206,652

(22) Filed: Aug. 10, 2011

(65) Prior Publication Data

US 2013/0038673 A1 Feb. 14, 2013

(51) Int. Cl.
*H04N 7/14* (2006.01)
*H04L 12/18* (2006.01)

(52) U.S. Cl.
CPC .............. *H04L 12/1818* (2013.01); *H04N 7/14* (2013.01)
USPC ........................................ 348/14.01; 709/204

(58) Field of Classification Search
None
See application file for complete search history.

(56) References Cited

U.S. PATENT DOCUMENTS

| 7,570,752 | B2 * | 8/2009 | Jachner .................... 379/202.01 |
| 7,720,952 | B2 * | 5/2010 | Miyata et al. ................. 709/223 |
| 2005/0027581 | A1 * | 2/2005 | Kjesbu et al. ..................... 705/8 |
| 2005/0058088 | A1 * | 3/2005 | Decker et al. .................. 370/260 |
| 2010/0149307 | A1 * | 6/2010 | Iyer et al. .................... 348/14.09 |
| 2012/0150956 | A1 * | 6/2012 | Tucker et al. ................. 709/204 |
| 2013/0088564 | A1 * | 4/2013 | Hillier et al. ............... 348/14.08 |
| 2013/0304924 | A1 * | 11/2013 | Dhara et al. .................. 709/226 |

* cited by examiner

*Primary Examiner* — Maria El-Zoobi
(74) *Attorney, Agent, or Firm* — Wong, Cabello, Lutsch, Rutherford & Brucculeri, L.L.P.

(57) ABSTRACT

Systems and methods are disclosed to automatically rescheduling and optionally transferring audio/video conferences when a conference runs longer than its previously allocated time. The disclosed relocation process incorporates one or more of a plurality of input sources such as electronic calendars, face/voice recognition systems, proximity systems, enterprise maps, and/or resource databases to assist in schedule adjustments. For example, if it is determined a meeting is running long then an organizer of a second impacted meeting can be notified of the over-run and prompted for information. If the second meeting organizer is amenable to delay or reschedule, options are presented to the second meeting organizer Once a plan change is determined, changes in schedule or location are automatically propagated to resources and attendees scheduled for the second meeting. Also, when a conference must relocate, actions associated with relocating resources are automated and confidentiality concerns can be taken into account.

34 Claims, 7 Drawing Sheets

AUTOMATED CALENDARED CONFERENCE RESCHEDULING AND FORWARDING

CROSS REFERENCE TO RELATED APPLICATIONS

This Application is related to U.S. patent application Ser. No. 12/483,493 entitled "Extended Presence for Video Conferencing Systems," filed 12 Jun. 2009, which is incorporated by reference herein in its entirety.

FIELD OF DISCLOSURE

This disclosure relates generally to the field of audio and video conferencing. More particularly, but not by way of limitation, this disclosure relates to a method of automatically rescheduling and optionally transferring video and audio conferences when a conference in progress runs longer than its previously allocated time. The disclosed method, system and computer program product incorporate a plurality of input sources to assist in schedule adjustments. In some embodiments, sources include but are not limited to one or more of, electronic calendars, face recognition systems, voice recognition systems, proximity systems, enterprise maps, resource databases, etc.

BACKGROUND

In modern business organizations it is not uncommon for groups of geographically disperse individuals to participate in audio conferences, video conferences, data conferences (e.g., via NetMeeting or WebEx) or some combination thereof. Throughout this disclosure reference to meetings and conferences may be used interchangeably as required by context. Scheduling such conferences/meetings, e.g., coordinating contact times, conference room availability and equipment availability may at times be problematic. Additionally, it is not uncommon for an established meeting to run over by a few minutes or even a significant amount of time. In the prior art, when a scheduled meeting runs over, that meeting may have to be abruptly ended and started again at a future time for completion. This type of rescheduling is inefficient for several reasons because there is an associated "restart" time where attendees of the meeting may have to be reminded of one or more topics previously under discussion. Additionally, the follow up meeting may not be scheduled right away leading to a more significant delay in coming to a resolution for topics under discussion at the meeting. Furthermore, there may have actually been available resources that could have been allocated almost immediately to continue an in-progress meeting.

In the case when meetings are scheduled "back-to-back," a meeting over-run could impact the participants of the second meeting by causing a delay in their start time. If a third meeting is scheduled behind the second meeting the net result may be that the second meeting cannot utilize resources for the entire scheduled time allotment. If a participant, in the meeting that needs to continue, knows of an available alternate conference room to move to, the overhead of manually "transferring" people and resources to the alternate conference room necessarily has some overhead cost and could be prone to mistakes. For example, if a video conference is being recorded on a recording device the follow on meeting setup may unintentionally forget to initiate a recording resulting in a loss of complete recording. The loss of complete recording may impact scheduled participants who were unable to be in attendance and were relying on catching up via the recording and could similarly impact anyone in the future wanting to replay an archived meeting.

In general, there is a need for a system and method to more efficiently utilize enterprise resources in the event that a scheduled meeting runs over its allotted time. This disclosure presents solutions to these and other problems by presenting, among other things, methods and systems to automatically transfer an in-progress meeting in a variety of ways and by taking into account confidentiality concerns regarding pausing and continuing a meeting in a second location.

SUMMARY

Disclosed are methods to extend and relocate an in-progress meeting whereby the conferencing devices in use by the in-progress meeting either have their schedule extended or are replace by alternate available resources if possible. In one embodiment, a method of automatically extending a meeting that is utilizing conferencing devices is disclosed wherein the method comprises determining an in-progress meeting will extend beyond its currently scheduled ending time; identifying, using a processor, one or more resources, in use by the in-progress meeting, that will have a conflict caused by over-run of the in-progress meeting, the identified resources being resources in conflict; identifying another meeting associated with at least a portion of the resources in conflict, the at least a portion identifying a first subset of resources in conflict; identifying a meeting organizer of the another meeting; sending a request for permission to over-run to the meeting organizer; receiving a response to the request for permission; automatically extending a schedule of at least a portion of the first subset of resources in conflict if permission is granted; and initiating a search for alternatives to the first subset of resources in conflict if permission is not granted.

In another embodiment, a method of searching for resources to continue an in-progress meeting (expected to over-run its scheduled duration) is disclosed, wherein that method comprises receiving an indication of resources in use by an in-progress meeting that will have a conflict caused by over-run of the in-progress meeting, the indication identifying one or more resources in conflict; receiving an indication of duration of over-run; identifying alternative resources substantially equivalent to the one or more resources in conflict available at the time of over-run for a time at least as great as the indicated duration of over-run; and automatically scheduling the identified alternative resources for use by the in-progress meeting at the time of over-run for a time at least as great as the indicated duration of over-run. In a case where a plurality of alternative resources are available a user (e.g., a meeting participant) may be prompted to select from the plurality of alternate resources.

In yet another embodiment, a meeting organizer of an in-progress meeting can extend the in-progress meeting utilizing a "find participants in enterprise" option whereby participants forced to leave a first meeting location are located automatically (utilizing various location techniques including face recognition, voice recognition, RFID tagging, GPS location mechanisms, etc.) when arriving at suitable locations for continuing the meeting. Once a suitable number of participants are located, the devices at each participant's new location can be activated and connected to the in-progress meeting for it to continue. Also, a participant may be connected to the in-progress meeting via their personal smart phone if applicable.

DETAILED DESCRIPTION

The following disclosure describes "automated conference rescheduling" for an in-progress conference and for a second, usually later starting, conference when conference resources overlap. For example, a first conference runs over its allotted time and requires additional time to complete. Rather than halting the conference and restarting a second follow on conference, methods and systems are presented to adapt schedules for the first and possibly the second conference "on the fly" to allow both conferences to complete more efficiently. If the over-run of the first conference is expected to be short, the second conference may merely be delayed a few minutes (with notification to participants of second conference of the delay in start time for their conference). Alternatively, if the first conference requires another time block or the second conference cannot be affected by delay, the second conference can be relocated to an available conference room or the first conference can be relocated, approximately at its originally scheduled end time, to an alternate conference room or the first conference can have its conference type changed so that it may continue with minimal impact. Both of these alternatives can be automated to a significant degree to minimize inefficiency and effort on the part of the first conference and second conference participants.

As used herein, a "conference" can be any combination of one or more endpoints configured to facilitate simultaneous communication amongst a group of people including audio, video, and/or data conferences. Also, as used herein, a "conferencing entity" refers to devices, participants, conference rooms, and other things that may be scheduled to participate in a conference. Typically, a conference will include a subset of the available people (i.e., meeting invitees) and a subset of the available technical and physical infrastructure. Technical infrastructure can include networks, bridging devices, multipoint control units, end point devices, etc. Note that some parts of the technical infrastructure will be capable of supporting multiple conferences at the same time while other parts of the technical infrastructure will be limited to a single conference at a time. Physical infrastructure can include offices, conference rooms, and other places where conference participants may be physically present.

Additionally, physical conference rooms may contain video/audio equipment and other physical and technical capabilities used to communicate with other such conference rooms or individuals. The attributes of a physical conference room and/or the technical capabilities of the equipment residing therein may be taken into account when adjusting between each location in an enterprise. For example, the size of the conference room or number of occupants it can support might be useful information. Alternatively, parameters of the equipment, such as display size, number of displays, capabilities for display of presentation content in addition to video content of participants, stereo sound, etc. may also be of use and therefore can be advantageously included in the determination to select a location (either initial or for moving) for a conference.

Figure 1:
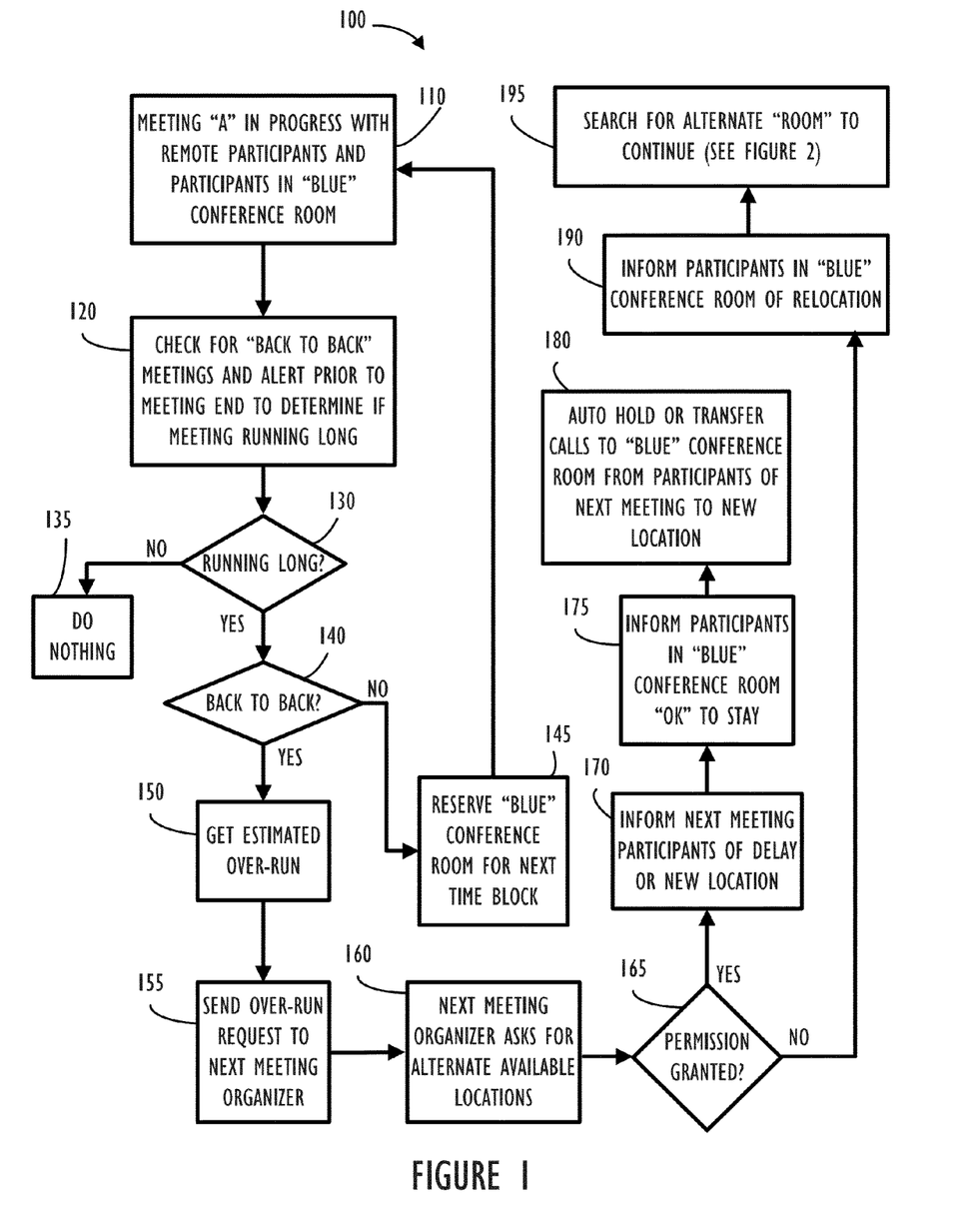
FIG. 1 illustrates, in flowchart form, a process for determining if a meeting can run over while mitigating impact on a second meeting utilizing the same or overlapping resources.

Referring now to FIG. 1, an embodiment of a method for processing a conference over-run is shown. Process 100 begins at block 110 with meeting "A" in-progress and connected to one or more remote participants. Local (near-end) participants are physically in conference room "Blue" and, for this example; remote participants are in conference room "White." Near the scheduled end time (e.g., five minutes before) a conferencing device associated with conference room Blue can inquire from participant(s) of conference room Blue if the meeting is expected to run long (block 120). Prior to presenting the query, a check can be made to determine if another meeting (meeting "B") is scheduled for any of the conference resources associated with meeting "A" (i.e., a "back-to-back" scheduling situation). If there is no conflict in resources, the query/alert displayed in conference room Blue can include this information. If at decision block 130, the meeting appears to be ending on time (NO prong of block 130), then flow can continue to block 135 with nothing special being performed. Alternatively, if the meeting needs additional time to complete (YES prong of block 130), flow can continue to block 140. At block 140, a "back-to-back" determination can be made (if one was not already performed in conjunction with block 120) and analyzed to determine over-run options. If there is no conflict in resources (NO prong of block 140) flow can continue to block 145 where Blue conference room and other resources associated with meeting A can be reserved for an additional time block to allow meeting A to complete with no interruption. However, if there is a "back-to-back" conflict (YES prong of block 140) another query could be made to determine an estimated over-run.

At block 155, a request for over-run can be sent to the organizer of meeting B (the meeting with conflict for resources) to determine if an over-run, and thus delay of meeting B, is acceptable. Upon receipt of the query, meeting B's organizer can optionally check for alternate available locations matching his meeting criteria (block 160) so that meeting B can take place at its originally scheduled time in a different near-end location or by using different conferencing resources (e.g., a common conference recorder caused conflict and cannot support both meetings simultaneously). At block 165, it is determined if meeting B's organizer has granted permission to allow the over-run. If meeting B cannot be delayed or have its resources changed to support the over-run request (NO prong of block 165), the participants of meeting A in Blue conference room can be informed of the impact to their meeting/conference (block 190). The information could include a need to physically relocate or a loss in their capability to record the remainder of their meeting. Note that these are just two example impacts among many possible impacts. Based on the information that meeting A cannot continue without impact, the organizer of meeting A can perform a search (block 195) for an alternate room or alternate resources as described in more detail below (See FIG. 2).

Returning to block 165, if the organizer of meeting B grants permission for the over-run (YES prong of block 165), flow continues to block 170 to inform participants of meeting B that meeting B will be delayed, re-located, or have some other type of impact. At block 175 participants of meeting A in conference room Blue can be informed that their meeting over-run request has been granted and they can continue their meeting. Of course, blocks 170 and 175 could be performed in parallel and not serially as shown.

At block 180, impacts to meeting B can be taken into account. If meeting connection information has been sent out to participants of meeting B the meeting connection information and start time can be updated automatically. As known to those of ordinary skill in the art, meeting information is often kept in electronic calendars and meeting invite requests can contain a hyper-link to allow participants to connect to a meeting. By updating this information in the call in information, participants of meeting B can call directly into the recently altered meeting B configuration. Additionally, any calls to meeting room Blue from participants of meeting B (remember meeting A is still ongoing in conference room Blue) can be automatically redirected by conferencing devices to the new location of meeting B. This second scenario prevents any meeting B participants that did not or could not receive the recently altered meeting B information from interrupting meeting A. Also, if meeting B participants connect to meeting A, not only are they impacted by not joining the correct meeting but any confidential information from meeting A could be inadvertently exposed to an unintended party.

In the example just explained, several types of information have been exchanged between meeting participants and conference resources. As is known to those of skill in the art, there are many different ways to exchange real-time or near real-time information including but not limited to, instant messaging, email, text messaging, extended presence information, etc. Any one or a combination of these and other types of one-way and two-way communication are contemplated in this disclosure to inform or query participants of both meetings A and B as well as keeping far-end participants apprised of changes to their respective meetings. For more explanation as to how extended presence information might be used please see related U.S. patent application Ser. No. 12/483,493 entitled "Extended Presence for Video Conferencing Systems" filed 12 Jun. 2009.

Figure 2:
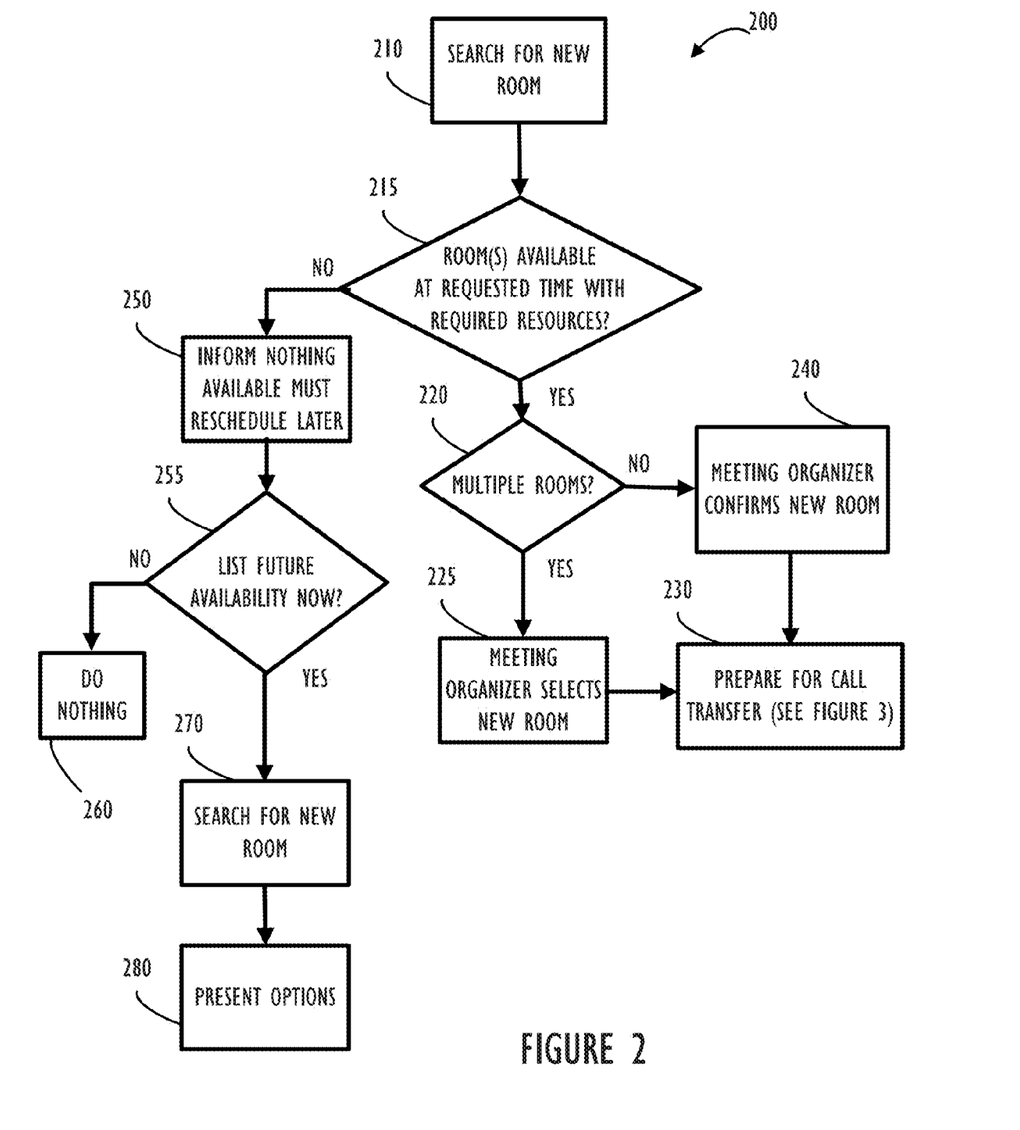
FIG. 2 illustrates, in flowchart form, a process for searching for a new room to continue an in-progress meeting.

Referring now to FIG. 2, process 200 illustrates one possible embodiment for searching for an alternate room to relocate an in-progress meeting. Searching concepts of process 200 could be similar for a relocating meeting that has run overtime or relocating a meeting when the second meeting organizer has agreed to relocation, such as the meeting organizer of meeting B in the example of FIG. 1 (YES prong of block 165), (i.e., relocate second of back-to-back meetings just prior to the second meeting start time). One notable difference could be that proximity of new location to previous location may not be given as much weight because the actual meeting has not started yet and participants might be more able to adapt to the new location without schedule delay.

Beginning at block 210, a search for a new room begins. At block 215, it can be determined if a conference room and conference resources are available at the requested time. Presumably, the requested time is right away because minimizing meeting interruption would typically be a preference. Alternatively, the meeting may break for a period of time (e.g., lunch, rest room break, etc.). In the usual case, when the meeting continuation is almost immediate, available rooms presented for continuation can more heavily weight proximity of the new conference room to the original conference room. If no rooms matching search criteria are available (the NO prong of block 215) flow continues to block 250 where the meeting organizer is informed that nothing is currently available and the continuation meeting must be rescheduled later (possibly go to "find in enterprise" option described below with reference to FIG. 4). Next, the organizer may be presented an option to list future availability now (block 255). If the organizer does not wish to reschedule right now (NO prong of block 255) then nothing is done (block 260) and the original meeting continues for its originally allotted time. Alternatively, if the meeting organizer wishes to reschedule (YES prong of block 255) then a search for a new room (block 270) can take place using a more conventional algorithm (or could be modified as explained below) because the scheduling time is in the future and need not necessarily take into account concerns associated with ad-hoc continuation of an in-progress meeting.

This search (block 270) could differ from a standard appointment search because attendees might be able to agree to "bump anything else" that is on their calendar to complete this particular meeting. Options could be presented to the user (block 280) while at the very end of the first meeting such that verbal verification of attendee availability (regardless of what is actually in participants electronic calendars) can take place. A standard scheduling approach would not know of this agreement and may consider participants availability when presenting options. Simply put, the options presented in block 280 my ignore participants regular meetings and focus on resource availability instead.

Figure 3:
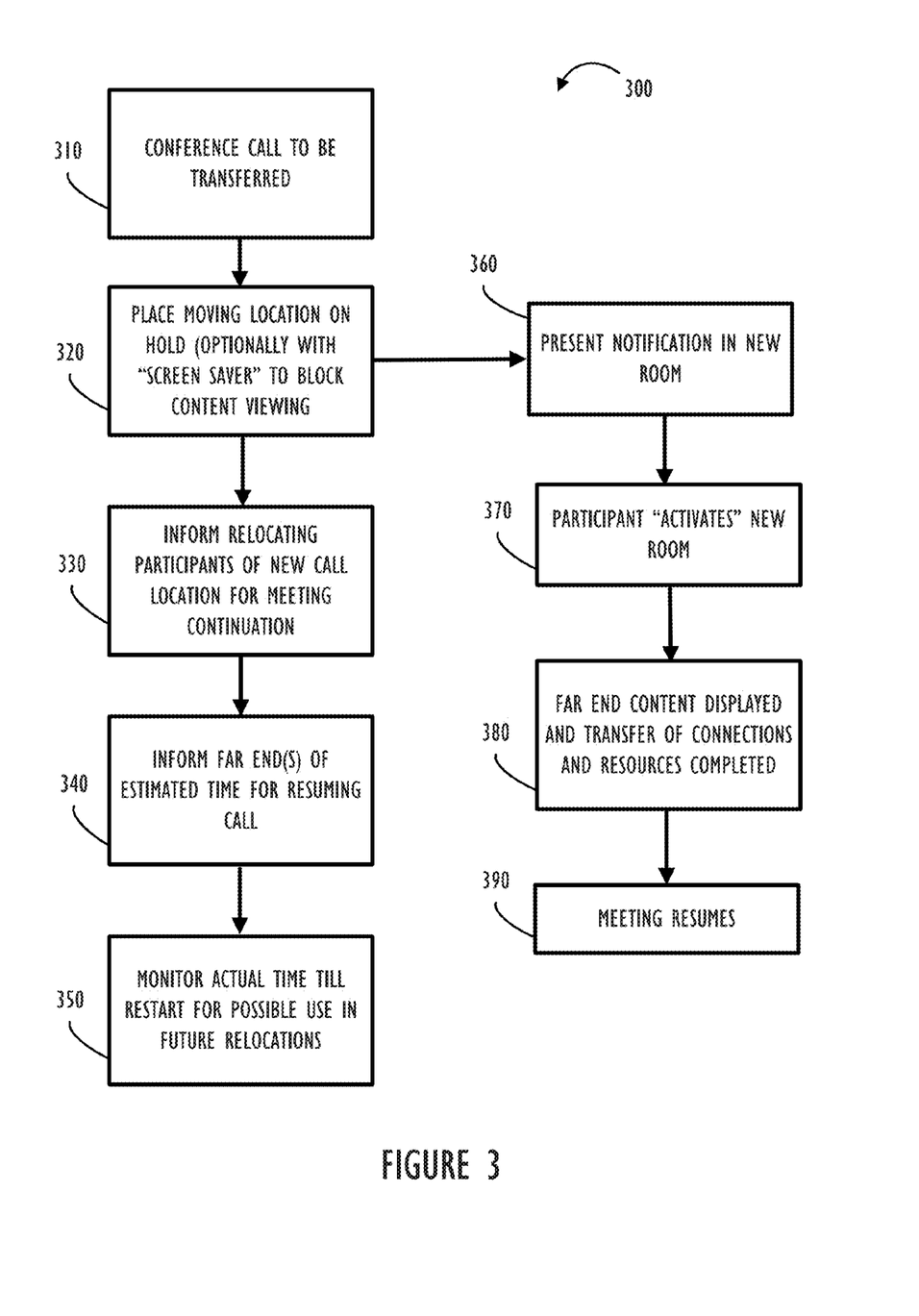
FIG. 3 illustrates, in flowchart form, a process for automatically transferring a conference to a new near end location while taking into account confidentiality concerns.

Referring now to FIG. 3, process 300 illustrates one embodiment for transferring a conference call. Beginning at block 310 a conference call has been identified for transfer (e.g., from block 230 of FIG. 2). At block 320, conference supporting apparatus can be placed "on hold" as required. For example, one or more of the following may take place: a call can be placed on hold pending transfer to one or more new locations; a video screen at the near end of the conference can change to a screen saver image or be blanked out because the current screens at the moving end are no longer participating in the same meeting; a recording device can pause the act of recording; and scheduling software can update schedules to free/re-assign equipment at the conference room exiting the meeting being transferred. At block 330, participants forced to re-locate can be informed of their new (i.e., continuing) call location. Far ends can be informed of an estimated time for resuming the call (block 340). Block 350 represents a monitoring of the actual time till restart. The actual time of restart and duration of re-location can be saved and used to refine estimates of future similar relocations.

Block 360 represents activities that can begin to take place in a new meeting room, such as presenting a screen (without actual meeting content) to identify the meeting being transferred. At block 370 a participant can arrive at the new location and "activate" the new location such that the previous meeting can resume. As explained above, the actual time of activation can be used to determine actual time taken for participants to re-locate. Upon activation (possibly requiring a password) actual meeting content and active audio connections can be established in the conference room (block 380). Once all required infrastructure supporting the meeting has been taken care of the meeting can resume (block 390).

Figure 4:
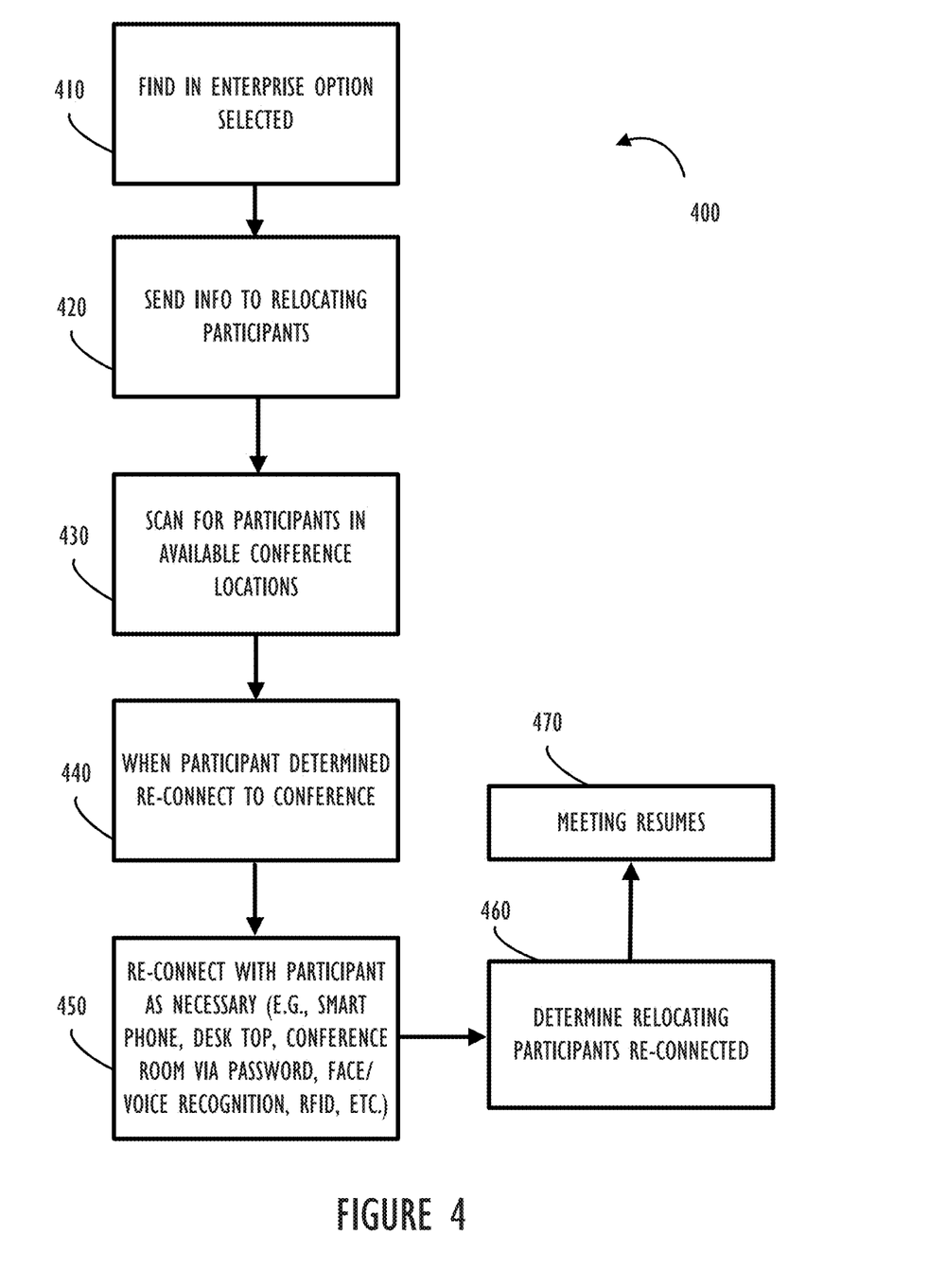
FIG. 4 illustrates, in flowchart form, a method of continuing an in-progress meeting using a "find in enterprise" option for meeting participants.

Referring now to FIG. 4, process 400 illustrates a "find in enterprise" option for transferring a conference call or even initiating a new conference call. In general, this option will locate invited participants in an enterprise, such as on an office complex, and attempt to connect them to the conference as conveniently as possible based on their location and required conferencing capabilities. Beginning at block 410 a meeting organizer (or organizer of a meeting being relocated) selects a find in enterprise option for selected participants. Next, at block 420, information regarding the meeting is sent to relocating participants (or participants at undetermined locations). Once notified, selected participants can proceed to an available conferencing facility such as a conference room, their personal conferencing station, or activate a connection from a mobile smart phone, etc. Each participant can be automatically identified as arriving at a conference room (e.g., face recognition, voice recognition, RFID tag, password entry, etc) and connected to the conference (block 430). When participants have been determined to be either connected or re-connected (block 440) to the conference, devices associated with the participant in the current location of the participant can be connected to the conference as necessary (block 450). Once all relocating or desired participants have been connected to the conference and its now current infrastructure (block 460) the meeting can resume (block 470).

Figure 5:
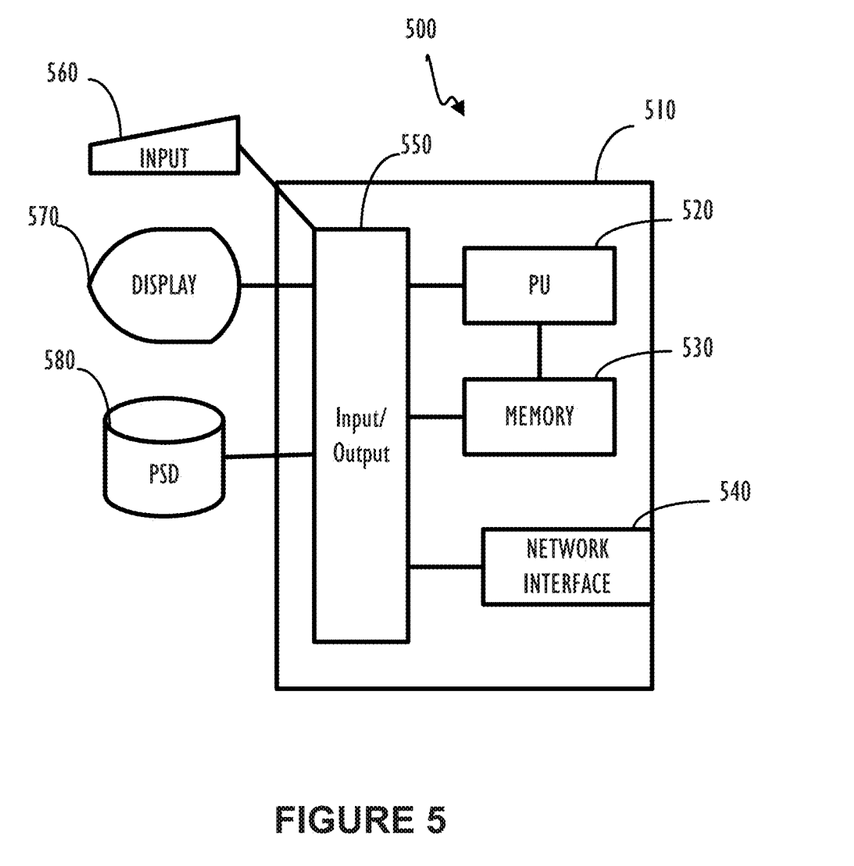
FIG. 5 shows, in block diagram form, a programmable control device comprising a processing unit as may be found in selected corporate devices.

Referring now to FIG. 5, an exemplary conferencing device 500 is shown. Exemplary conferencing device 500 comprises a programmable control device 510 which may be optionally connected to input 560 (e.g., keyboard, mouse, touch screen, etc.), display 570 or program storage device 580. Also, included with programmable control device 510 is a network interface 540 for communication via a network with other conferencing and corporate infrastructure devices (not shown). Note network interface 540 may be included within programmable control device 510 or be external to programmable control device 510. In either case, programmable control device 510 will be communicatively coupled to network interface 540. Also note program storage unit 580 represents any form of non-volatile storage including, but not limited to, all forms of optical and magnetic storage elements including solid-state storage.

Programmable control device 510 may be included in a conferencing device and be programmed to perform methods in accordance with this disclosure (e.g., those illustrated in FIGS. 1-5). Programmable control device 510 comprises a processor unit (PU) 520, input-output (I/O) interface 560 and memory 530. Processing unit 520 may include any processor including, for example, the Intel Core®, Pentium® and Celeron® processor families from Intel and the Cortex and ARM processor families from ARM. (INTEL CORE, PENTIUM and CELERON are registered trademarks of the Intel Corporation. CORTEX is a registered trademark of the ARM Limited Corporation. ARM is a registered trademark of the ARM Limited Company.) Memory 530 may include one or more memory modules and comprise random access memory (RAM), read only memory (ROM), programmable read only memory (PROM), programmable read-write memory, and solid state memory. One of ordinary skill in the art will also recognize that PU 520 may also include some internal memory including, for example, cache memory.

Various changes in the materials, components, circuit elements, as well as in the details of the illustrated operational methods are possible without departing from the scope of the following claims. For instance, acts in accordance with FIGS. 1-4 may be performed by a programmable control device 510 executing instructions organized into one or more modules (comprised of computer program code or instructions). A programmable control device 510 may be a single computer processor (e.g., PU 520), a plurality of computer processors coupled by a communications link or one or more special purpose processors (e.g., a digital signal processor, DSP). Such a programmable control device 510 may be one element in a larger data processing system such as a general purpose computer system. Storage media, as embodied in storage devices such as 580, as well as memory internal to programmable control device 510, suitable for tangibly embodying computer program instructions include, but are not limited to: magnetic disks (fixed, floppy, and removable) and tape; optical media such as CD-ROMs and digital video disks (DVDs); and semiconductor memory devices such as Electrically Programmable Read-Only Memory (EPROM), Electrically Erasable Programmable Read-Only Memory (EEPROM), Programmable Gate Arrays and flash devices. These are also sometimes referred to as computer readable medium or program storage devices.

Figure 6:
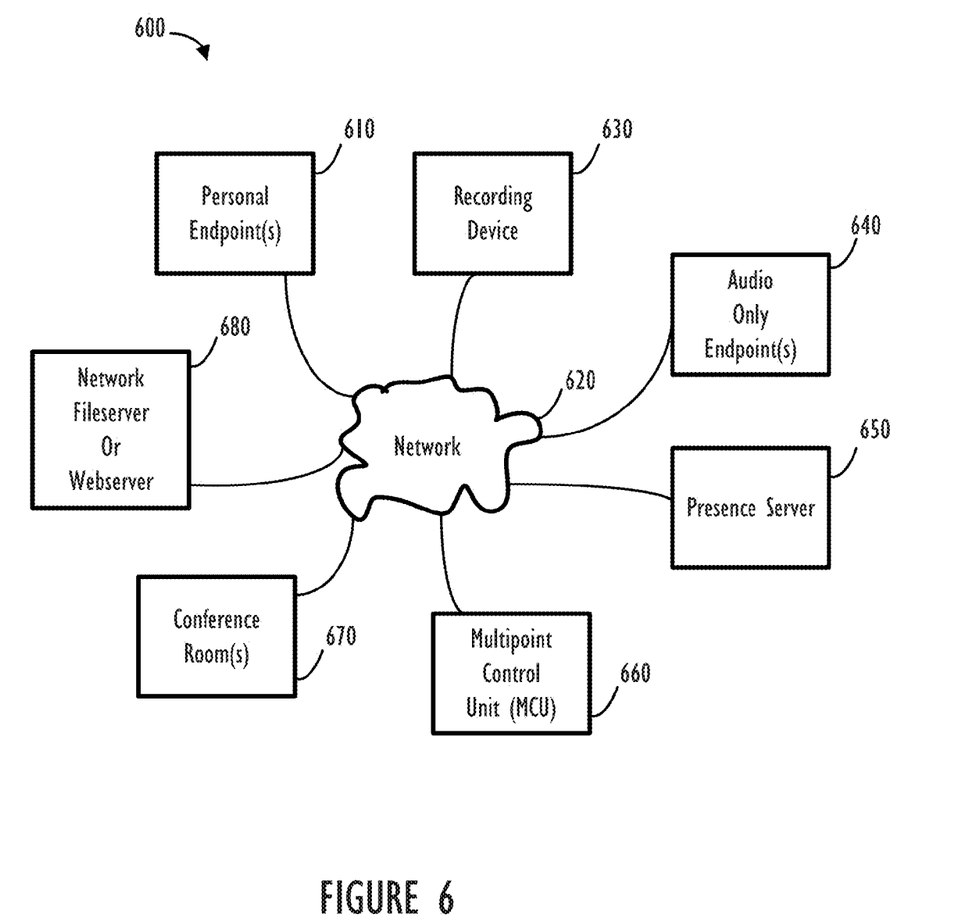
FIG. 6 shows, in block diagram form, exemplary corporate devices pertaining to audio/video conferences communicatively coupled via a network.

In addition, programmable control device 510 may be included in one or more of a multiplicity of devices and computer systems coupled through a computer network represented by network 620 as illustrated in FIG. 6. Corporate network 600 comprises multiple computer systems or programmable devices 610 and 630-680 communicatively coupled to each other through network 620. Network 620 represents a plurality of network technologies enabling computers to be communicatively coupled (e.g., LAN, WAN, POTS, Ethernet, TCP/IP, ATM, etc.). Additionally, other supporting devices (not shown) may be communicatively coupled to computer network 600. These supporting devices are known to those of ordinary skill in the art and include, but are not limited to: personal endpoint 610, recording device 630, speaker phone 640, presence server 650, file server or web server 680, network attached storage, printers, etc. Conference room 670 may be associated with a device attached to network 620 to act as a proxy for maintaining the physical conference room information. Network 620 could be one or more intranets, one or more extranets (e.g., the Internet) or a combination of both intra- and extranets. In network 600, Multipoint Control Unit (MCU) 660, for example, could include memory for retaining program modules for performing any of the methods illustrated in FIGS. 1-4. Note each of the above described supporting devices may also be combined into a single physical device or combination of devices.

Figure 7:
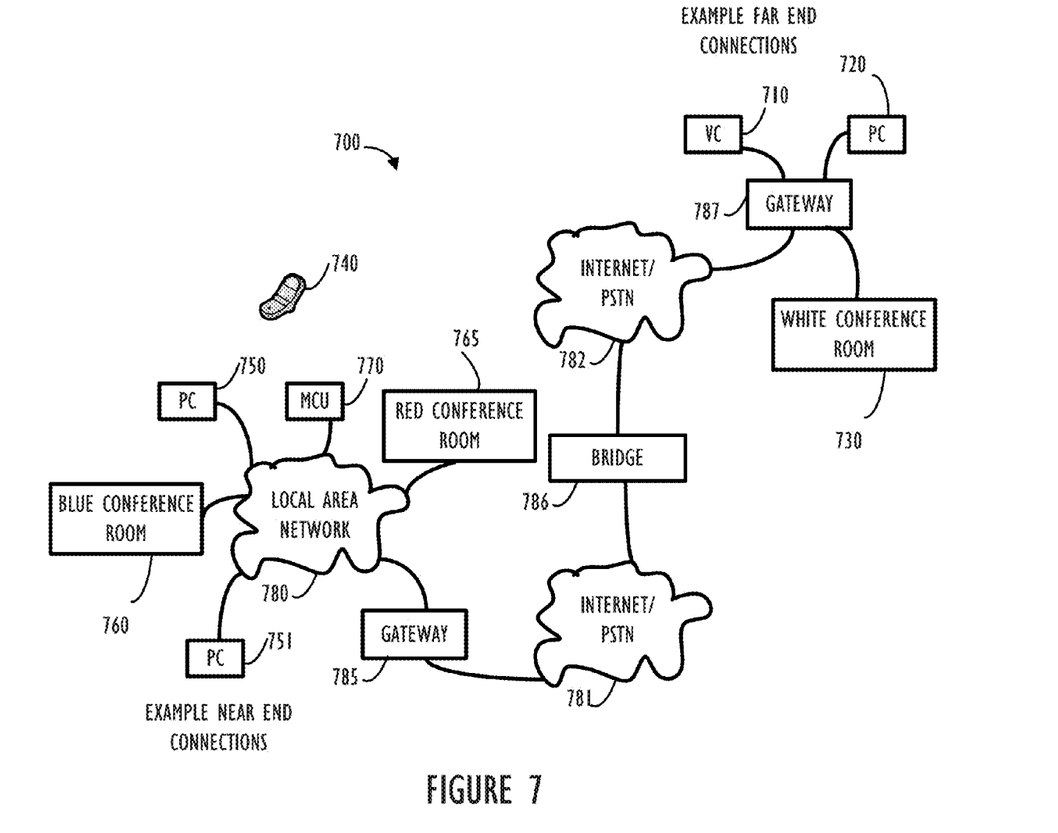
FIG. 7 shows, in block diagram form, exemplary networked devices engaged in an example video conference.

Referring now to FIG. 7, a conference infrastructure 700 is shown to illustrate one embodiment of this disclosure. An example conference utilizing infrastructure 700 could be similar to that described above relative to FIGS. 1-4. For example, a conference at near-end conference room Blue 760 could be relocated to near-end conference room Red 765 while participants at a far-end location such as PC 720 or conference room White 770 are placed "on hold" during the relocation. Also cellular phone 740 and near end personal computer (PC) 751 represent participants that could not relocate to conference room Red 765 and continued participation in meeting A via cellular phone 740 and PC 751 respectively. Video conferencing equipment 710 and personal computer 720 could be located in a first office building at a far end while devices connected directly to local area network 780 (i.e., 730, 750 and 760) are located in a second near-end office building or office complex. In this example, each of the office buildings could have a LAN (780) and be additionally connected via the internet or the Public Switched Telephone Network (PSTN) (781 and 782) to the other office building utilizing gateways (785 and 787) and a bridge (786). The user of cellular phone 740 could be connected to the conference in an audio only mode via a cellular network (not shown) and not physically located in any conference building for the remainder of the conference. Note, in this case, because the user of cellular phone 740 was already a participant in the conference there may not be any need to transmit notification to endpoint devices. On the other hand, because this participant does not necessarily have access to presentation materials transmitting a notification may be desirable.

In the above detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim.

Various changes in the details of the illustrated operational methods are possible without departing from the scope of the following claims. For instance, illustrative flow chart steps of FIGS. 1-4 may perform the identified steps in an order different from that disclosed here. Alternatively, some embodiments may combine the activities described herein as being separate steps or perform the separate steps in parallel. Similarly, one or more of the described steps may be omitted, depending upon the specific operational environment the method is being implemented in.

The invention claimed is:

1. A method of automatically extending a meeting that is utilizing conferencing devices, the method comprising:
   determining an in-progress meeting will extend beyond its currently scheduled ending time;
   identifying, using a processor, one or more resources, in use by the in-progress meeting, that will have a conflict caused by over-run of the in-progress meeting, the identified resources being resources in conflict;
   identifying another meeting associated with at least a portion of the resources in conflict, the at least a portion identifying a first subset of resources in conflict;
   identifying a meeting organizer of the another meeting;
   sending a request for permission to over-run to the meeting organizer;
   receiving a response to the request for permission;
   automatically extending a schedule of at least a portion of the first subset of resources in conflict if permission granted; and
   initiating a search for alternatives to the first subset of resources in conflict if permission not granted.

2. The method of claim 1, wherein a subset of the one or more resources in use by the in-progress meeting are identified as resources in conflict.

3. The method of claim 1, wherein if permission is granted, automatically extending schedule of all the one or more resources in use by the in-progress meeting.

4. The method of claim 1, wherein if permission is granted, informing participants of the another meeting of an estimated delay in starting time.

5. The method of claim 1, wherein if permission is granted, informing participants of the in-progress meeting of the permitted time of over-run.

6. The method of claim 1, wherein if permission is granted further comprising:
   holding calls into the another meeting automatically for duration of over-run.

7. The method of claim 1, wherein if permission is granted further comprising:
   informing participants of the another meeting of an alternate location for the another meeting.

8. The method of claim 7, further comprising automatically transferring calls intended for the another meeting from the conference room of the in-progress meeting to the alternate location for the another meeting.

9. The method of claim 1, further comprising:
   requesting and receiving an estimated time of over-run; and
   including the estimated time in the request for permission to over-run.

10. The method of claim 1, further comprising:
    associating a priority of importance with the request for permission; and
    including the priority of importance in the request for permission to over-run.

11. The method of claim 1, wherein the in-progress meeting is a hybrid conference with video endpoints and at least one audio only endpoint.

12. The method of claim 1, further comprising:
    identifying a third meeting associated with at least a portion of the resources in conflict, the at least a portion identifying a second subset of resources in conflict;
    identifying a meeting organizer of the third meeting;
    sending a separate request for permission to over-run to the third meeting's organizer;
    receiving a response to the separate request for permission;
    automatically extending a schedule of at least a portion of the second subset of resources in conflict if permission granted to the separate request; and
    initiating a search for alternatives to the second subset of resources in conflict if permission not granted.

13. The method of claim 1, further comprising:
    receiving an indication of duration of over-run;
    receiving an indication that a search for alternatives should be initiated;
    identifying alternative resources substantially equivalent to the one or more resources in conflict, the alternative resources available at the time of over-run for a time at least as great as the indicated duration of over-run; and
    automatically scheduling the identified alternative resources for use by the in-progress meeting at the time of over-run for a time at least as great as the indicated duration of over-run.

14. The method of claim 13, wherein at least a portion of the one or more resources in conflict are released from use by the in-progress meeting at the time of over-run.

15. The method of claim 13, wherein at least a portion of the one or more resources in conflict are released from use by the in-progress meeting at about the time a corresponding one of the identified alternative resources is put in use by the in-progress meeting.

16. The method of claim 13, further comprising:
    presenting a selection of the identified alternative resources; and
    receiving an indication of a selected group of the identified alternative resources;
    wherein automatically scheduling the identified alternative resources comprises only automatically scheduling the selected group.

17. A method of continuing a meeting, which is utilizing conferencing devices, at another location, the method comprising:
    determining an in-progress meeting at a first physical location will extend beyond its currently scheduled ending time;
    identifying, using a processor, one or more resources, in use by the in-progress meeting, that will have a conflict caused by over-run of the in-progress meeting, the identified resources being resources in conflict, wherein one of the resources in conflict includes the first physical location, the first physical location also comprising a local endpoint of a multimedia conference;
    identifying one or more different locations to continue the in-progress meeting;
    placing the local endpoint of the multimedia conference on standby with respect to other conferencing devices in use by the in-progress meeting;

informing participants at the first physical location of a second location to continue the in-progress meeting;

presenting information to far-end participants of temporary unavailability of the participants at the first physical location, the temporary unavailability with respect to changing location of participants at the first physical location to the second location; and resuming the in-progress meeting when the participants at the first physical location are available at the second location.

18. The method of claim 17, wherein the second location comprises a plurality of locations other than the first physical location.

19. The method of claim 18, wherein at least one of the plurality of locations comprises a personal conferencing system.

20. The method of claim 18, wherein the at least one of the plurality of locations comprises a smart phone.

21. The method of claim 17, further comprising monitoring a time until restart of the in-progress meeting at the second location.

22. The method of claim 21, further comprising:
including an estimated time until restart, based on a previously saved monitored time until restart, when presenting information to far-end participants of temporary unavailability of the participants at the first physical location.

23. The method of claim 17, further comprising:
presenting a selection of the one or more different locations to continue the in-progress meeting;
receiving an indication of a selected different location; and
automatically transferring at least a portion of the resources in conflict to an alternative resource at the selected different location.

24. The method of claim 17, further comprising:
automatically transferring at least a portion of the resources in conflict to a resource at the second location, the at least a portion including video resources; and
preventing display of meeting information at the second location until activated by a participant of the in-progress meeting.

25. The method of claim 17, further comprising:
automatically transferring at least a portion of the resources in conflict to a resource at the second location, the at least a portion including audio resources; and
preventing audio meeting information at the second location until activated by a participant of the in-progress meeting.

26. A conferencing device comprising:
a programmable control device communicatively coupled to a plurality of conferencing devices, wherein the programmable control device is configured to:
receive an indication that an in-progress meeting will extend beyond its currently scheduled ending time;
identify one or more resources, in use by the in-progress meeting, that will have a conflict caused by over-run of the in-progress meeting, the identified resources being resources in conflict;
identify another meeting associated with at least a portion of the resources in conflict, the at least a portion identifying a first subset of resources in conflict;
identify a meeting organizer of the another meeting;
send a request for permission to over-run to the meeting organizer;
receive a response to the request for permission;
extend a schedule of at least a portion of the first subset of resources in conflict if permission granted; and
initiate a search for alternatives to the first subset of resources in conflict if permission not granted.

27. The conferencing device of claim 26, wherein the programmable control device is further configured to:
identify a third meeting associated with at least a portion of the resources in conflict, the at least a portion identifying a second subset of resources in conflict;
identify a meeting organizer of the third meeting;
initiate sending of a separate request for permission to over-run to the third meeting's organizer;
receive a response to the separate request for permission;
extend a schedule of at least a portion of the second subset of resources in conflict if permission granted to the separate request; and
initiate a search for alternatives to the second subset of resources in conflict if permission not granted.

28. The conferencing device of claim 26, wherein the programmable control device is further programmed to:
determine permission is not granted;
receive an indication of duration of over-run
identify alternative resources substantially equivalent to the one or more resources in conflict available at the time of over-run for a time at least as great as the indicated duration of over-run; and
schedule the identified alternative resources for use by the in-progress meeting at the time of over-run for a time at least as great as the indicated duration of over-run.

29. The conferencing device of claim 26, wherein the programmable control device is further programmed to:
determine permission is granted:
initiate an information message to participants of the another meeting, the message identifying an alternate location for the another meeting.

30. The conferencing device of claim 29, wherein the programmable control device is further programmed to:
send an indication to another conferencing device, the indication providing information to automatically transfer calls intended for the another meeting from the conference room of the in-progress meeting to the alternate location for the another meeting.

31. A conferencing device comprising:
a programmable control device communicatively coupled to a plurality of conferencing devices, wherein the programmable control device is configured to:
receive an indication that an in-progress meeting at a first physical location will extend beyond its currently scheduled ending time;
identify, using a processor, one or more resources, in use by the in-progress meeting, that will have a conflict caused by over-run of the in-progress meeting, the identified resources being resources in conflict wherein one of the resources in conflict includes the first physical location, the first physical location also comprising a local endpoint of a multimedia conference;
identify one or more different locations to continue the in-progress meeting;
initiate a placement the local endpoint of the multimedia conference on standby with respect to other conferencing devices in use by the in-progress meeting;
initiate an informing of participants at the first physical location of a second location to continue the in-progress meeting;
initiate a presentation of information to far-end participants of temporary unavailability of the participants at the first physical location, the temporary unavailability with respect to changing location of participants at the first physical location to the second location; and initiate a continuation of the in-progress meeting when the participants at the first physical location are available at the second location.

32. The conferencing device of claim 31, wherein the programmable control device is further configured to:

present a selection of the one or more different locations to continue the in-progress meeting;

receive an indication of a selected different location; and send an indication to another conferencing device, the indication including information for automatically transferring at least a portion of the resources in conflict to an alternative resource at the selected different location.

33. A non-transitory program storage device with instructions for controlling a programmable control device stored thereon, the instructions for configuring the programmable control device to perform the method of claim 1.

34. A non-transitory program storage device with instructions for controlling a programmable control device stored thereon, the instructions for configuring the programmable control device to perform the method of claim 17.

* * * * *